United States Patent
Borowsky et al.

[11] Patent Number: 6,119,174
[45] Date of Patent: Sep. 12, 2000

[54] METHODS AND APPARATUS FOR IMPLEMENTING QUALITY-OF-SERVICE GUARANTEES IN DATA STORAGE SYSTEMS

[75] Inventors: Elizabeth L. Borowsky; Richard A. Golding, both of San Francisco; Arif A. Merchant, Los Altos; Mirjana Spasojevic; John Wilkes, both of Palo Alto, all of Calif.

[73] Assignee: Hewlett-Packard Company, Palo Alto, Calif.

[21] Appl. No.: 09/172,114

[22] Filed: Oct. 13, 1998

[51] Int. Cl.[7] .................... G06F 13/10; G06F 11/34; G06F 11/30; G06F 17/30; G06F 17/60
[52] U.S. Cl. .................... 710/15; 702/182; 702/183; 702/186; 707/101; 709/224; 709/201; 711/100; 711/117
[58] Field of Search .................... 710/15, 17, 18, 710/19, 100, 1; 364/500; 707/101, 203, 200, 1; 709/224; 711/118, 135; 370/465; 714/1, 47

[56] References Cited

U.S. PATENT DOCUMENTS

| | | | |
|---|---|---|---|
| 5,088,058 | 2/1992 | Salsburg | 364/500 |
| 5,269,011 | 12/1993 | Yanai et al. | 710/100 |
| 5,325,505 | 6/1994 | Hoffecker et al. | 707/101 |
| 5,375,070 | 12/1994 | Hershey et al. | 709/224 |
| 5,446,874 | 8/1995 | Waclawsky et al. | 714/1 |
| 5,461,611 | 10/1995 | Drake, Jr. et al. | 370/420 |
| 5,634,125 | 5/1997 | Li | 707/203 |
| 5,664,106 | 9/1997 | Caccavale | 709/224 |
| 5,668,944 | 9/1997 | Berry | 714/47 |
| 5,732,240 | 3/1998 | Caccavale | 711/118 |
| 5,742,819 | 4/1998 | Caccavale | 707/200 |
| 5,819,033 | 10/1998 | Caccavale | 709/224 |
| 5,835,756 | 11/1998 | Caccavale | 707/1 |
| 5,892,937 | 4/1999 | Caccavale | 711/135 |
| 5,926,481 | 7/1999 | Wang et al. | 370/465 |

*Primary Examiner*—Thomas C. Lee
*Assistant Examiner*—Katharina Schuster

[57] ABSTRACT

The value of a p-quantile of a workload distribution is computed to determine whether a data storage system satisfies a quality-of-service guarantee desired by a client. The quality-of-service guarantee may be a predetermined percentage of a workload being serviced by a device within a predetermined response time. A p-quantile value is set to be equal of the predetermined percentage of the quality-of-service guarantee, and a bound is set to be equal to the predetermined response time. A distribution for the workload arriving at the device during an interval of time equal to the bound is then estimated. It is then determined whether a p-quantile of the workload distribution is less than the bound. In cases where the p-quantile of the workload distribution is computed directly, then the p-quantile of the workload distribution is directly compared to the bound. In cases where the p-quantile of the workload distribution is not computed directly, then the p-quantile of the workload distribution is estimated, with the estimated value the compared to the bound.

20 Claims, 6 Drawing Sheets

METHODS AND APPARATUS FOR IMPLEMENTING QUALITY-OF-SERVICE GUARANTEES IN DATA STORAGE SYSTEMS

FIELD OF THE INVENTION

The present invention relates to methods for configuring computerized storage systems and more particularly to methods and apparatus which enable data storage systems to meet quality-of-service guarantees.

BACKGROUND OF THE INVENTION

One of the tasks undertaken by designers of computer systems, particularly data storage systems, is to design systems that are easy to use and that efficiently utilize resources. A simplified example of a data storage system may include a number of physical storage devices (e.g., hard drives) connected to a server and a number of workstations connected to the server. A workstation may send a request to the server to retrieve information stored in the storage system. Upon receiving the request, the server determines the location of the requested information and then retrieves the information from one of the hard drives. The requested information may then be sent back to the workstation.

The configuration and management of a large number of storage devices is a major undertaking and is important to the efficient operation of the storage system. The difficulties inherent in this undertaking are compounded by the sheer scale of many storage systems—tracking the thousands of physical and logical devices required to support a capacity of few tens of terabytes (TB) of data.

Designers need to consider first the problem of the initial configuration of the storage devices to meet performance and availability goals. Designers then need to consider the configuration of the storage devices with performance guarantees in view of a workload that is constantly changing, as well as a storage pool that is changing as new devices are added, as older devices become obsolete, and as defective devices are removed. These changes may be further compounded with a client's desire to share the storage across multiple computer systems with nearly arbitrary interconnection topologies via storage fabrics like fiber-channel networks. Adding to the complexity of the design process is the introduction of network-attached storage devices (NASD).

The process of designing data storage systems has reached the point where the cost of managing a device is several times the purchase price of the device itself. The planning for a medium-scale installation (e.g., a few terabytes) may take many months, representing a significant fiscal expenditure to a client. Indeed, the design and management of storage hardware has become a multibillion dollar business and represents a significant chunk of information-technology budget expenditures. Improving the way storage is used and managed would be beneficial for clients, system managers and administrators, and computer-system vendors.

Most existing approaches to storage management operate at too low a level. These conventional approaches require designers to allocate and configure disks or disk arrays to particular pieces of work but provide little help to the designers in doing so. For example, logical volume managers (LVM) provide a number of low-level mechanisms to allow multiple disks to be grouped together in different ways, but provide no additional help in predicting performance effects or in determining the data layout best to use.

The performance of a storage system may be measured with a number of attributes such as capacity and speed. The performance of a storage system may also be measured with what is known as quality-of-service guarantees. A quality-of-service guarantee for a system may be measured as a desired percentage of requests served in a desired period of time. A system designer needs to design the storage system to meet particular quality-of-service guarantees desired by a client.

For example, a client may want 95% of all requests from workstations to be served within a time frame of one second. The time frame is measured from the time a server receives a request from a workstation to the time the server transmits the information back to the workstation. In satisfying such a quality-of-service guarantee, the designer needs to design the storage system to include a sufficient number of hardware devices, such as servers and storage devices, and to configure such devices to ensure that 95% of requests are served in 1 second.

One of the delays which needs to be taken into consideration when designing a system to meet a quality-of-service guarantee is know as a queuing delay. Queuing delays may arise when a server is in the process of servicing a request from a first workstation and receives a request during that time from a second workstation. The request from the second workstation is queued and will not be serviced until the first request is completed by the server. If more than one request arrives at the server when the server is busy servicing a particular request, then a queue forms. In the long term, the server will eventually service all of the requests in the queue, but in the short term, some requests may suffer queue delays. In other words, queuing delays may cause a percentage of the workload (that is, the summation of all of the requests from all of the workstations) arriving at a device in a particular time interval not to be serviced within a desired response time.

A system designer may translate a quality-of-service guarantee of, for example, "95% of requests must be served in 0.25 second" as "the 0.95-quantile (i.e., $95^{th}$ percentile) of response time in the system must not exceed 0.25 second." More generally, the p-quantile (i.e., the 100 p percentile) of the workload must not exceed t seconds. The p-quantile of the workload in a system is difficult to determine using conventional analytical methods. For systems that can be modeled relatively simply, for example, a server with first-come-first-serve queuing and Poisson arrivals, one method of finding the p-quantile is through the use of standard M/G/1 queuing analysis and numerically inverting the resulting Laplace transform of the response time distribution. For more complex arrival processes, matrix-geometric methods may be used. However, such methods are relatively expensive in terms of computation time. When capacity planning is done using automated tools, the solution may involve checking the acceptability of thousands of alternative configurations, which requires a very fast test. However, as mentioned, conventional methods require substantial computation time and are, accordingly, too slow to meet the increasing need for cost-efficient systems.

In view of the foregoing, it is apparent that there is still a need for a method of designing a data storage system in which the p-quantile of a workload can be efficiently and quickly determined, thereby simplifying and rendering more efficient the process of designing storage systems.

SUMMARY OF THE INVENTION

In a preferred embodiment, the present invention provides methods and apparatus for determining the p-quantile of a workload in a relatively efficient and fast manner. In determining the value of the p-quantile in the design process, it can then be determined whether a data storage system satisfies a quality-of-service guarantee desired by a client.

One aspect of the invention is a method of determining whether a particular quality-of-service guarantee is met by a device. The quality-of-service guarantee is measured in terms of a predetermined percentage of a workload being serviced by a device within a predetermined response time. The method includes setting a p-quantile value equal of the predetermined percentage of the quality-of-service guarantee, and then setting a bound equal to the predetermined response time. A workload distribution arriving at the device during an interval of time equal to the bound is then estimated. It is then determined whether a p-quantile of the workload distribution is less than the bound.

In making this determination, in cases where the p-quantile of the workload distribution is calculated directly, then the p-quantile of the workload distribution is directly compared to the bound. In cases where the p-quantile of the workload distribution is not calculated directly, then the p-quantile of the workload distribution is estimated, with the estimated value the compared to the bound.

The method may be expanded into a configuration method of the invention which allows a data storage system to be configured to satisfy the desired quality-of-service guarantee.

Other aspects and advantages of the present invention will become apparent from the following detailed description, taken in conjunction with the accompanying drawings, illustrating by way of example the principles of the present invention.

DETAILED DESCRIPTION OF THE INVENTION

As shown in the drawings for purposes of illustration, the invention is embodied in methods and apparatus for determining the p-quantile of a workload in a relatively efficient and fast manner. In determining the value of the p-quantile in the design process, it can then be determined whether a data storage system will satisfy a quality-of-service guarantee desired by a client. The present invention reduces the substantial computation time and resultant slowness of conventional approaches at making this determination.

Prior to describing in detail the methods and apparatus of the invention for determining the p-quantile of a workload, the following detailed description will first describe an exemplary procedure for designing a data storage system, thereby placing the present invention in context with a preferred implementation and use. The determination of the p-quantile of a workload of the invention makes the exemplary design procedure more efficient and reliable.

Figure 1:
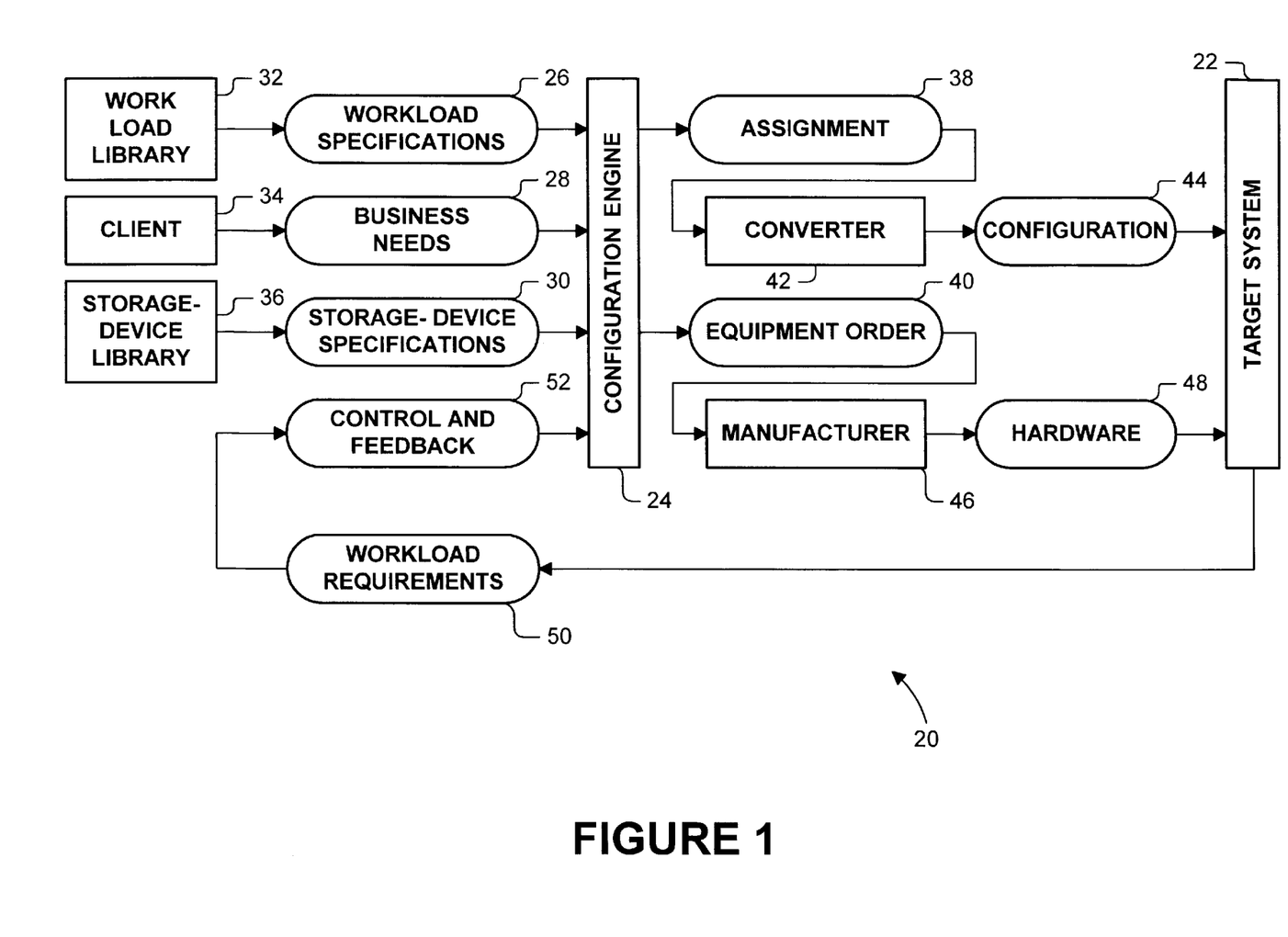
FIG. 1 is a flow diagram of an exemplary self-configuring and self-managing system for configuring a target data storage system in accordance with the present invention.

With reference to FIG. 1, an exemplary procedure 20 for designing a target system 22 is illustrated. The target system 22, which will be discussed in more detail below, may include any number of devices, such as computer workstations, host computers, and storage devices. The design procedure 20 includes initial steps of inputting information into a configuration engine 24. This information may include workload specifications 26, business needs 28, and storage-device specifications 30. As will be discussed in more detail below, the design procedure 20 allows clients to describe what they desire in the target system 22 and determines how best to provide the target system 22.

The workload specifications 26 may be determined by performing an informed assessment of the workload requirements for the target system. Such an assessment may be accomplished by monitoring or measuring an existing system, by predicting growth trends, by using workload libraries, by past experience, or all of the above. For example, by monitoring an existing system, data may be gathered on the performance of the system, which data may then be analyzed and input into the configuration engine 24. These data, along with other such data, may be used in developing a workload library 32 for future utilization in assessing workload requirements of another target systems. Exemplary data in the workload library 32 may include information for typical loads generated by a predetermined number of users in existing computer systems. Regarding the contribution of past experience to the input of workload specifications 26, by analyzing information on the size of the target system, knowledgeable system designers are able to formulate from experience an informed assessment of workload requirements. In summary, the workload specifications 26 may generally include workload libraries 32, workload measurements, and workload analysis and prediction.

The input of business needs 28 may include attributes a customer or client 34 desires in the target system 22. Such attributes may include transaction rates, response times, relative performance requirements, growth expectations, cost-versus-performance emphasis, and availability goals. More specifically, an exemplary transaction rate determined by a client 34 might be about 100 I/Os per second, and an exemplary response time desired by a client might be about 200 milliseconds (ms).

The storage-device specifications 30 may be stored and input from a library 36 of storage-device capabilities. The storage-device library 36 may include data relating to the specification (e.g., capacity) and performance of available storage devices, including physical drives, optical drives, and tape drives. The workload library and storage-device libraries 32 and 36 may constitute a database of information made accessible to the configuration engine 24.

After receiving the plural inputs 26–30, the configuration engine 24 evaluates the information and explores possible configurations for the target system 22 that meets the specific client needs (i.e., input 28). Completing the evaluation and determining the configuration with optimal performance, the configuration engine 24 generates an assignment 38 and an equipment order 40.

The assignment 38 is a description of what needs to be done to configure the target system 22. The assignment 38 contains information describing the way in which the workload is to be placed or mapped across the storage devices of the target system 22. The assignment 38 also contains information describing how the storage devices are to be configured. For example, assignment 38 may describe redundancy levels for disk arrays, network connections and topologies, assignment of logical units to controllers, and so on. In other words, the assignment 38 sets forth what work is to go on which device.

The assignment 38 is input into a converter 42 which translates the information of the assignment 38 into a configuration 44. The configuration 44 is an operating system (for example, HP-UX) that has the optimal configuration of the target system 22. The converter 42 may accomplish this task by, for example, generating logical volume manager (LVM) scripts and DG Clariion (Nike) disk-array configuration commands.

Turning to the equipment order 40, an equipment supplier or manufacturer 46 receives the equipment order 40 generated by the configuration engine 24 and, in turn, provides hardware 48 necessary to build the target system 22. The hardware 48 is then connected and configured according to the configuration 44 to build the actual target system 22.

Once built and running, the target system 22 may be monitored for behavior and performance, thereby generating workload measurements 50. The workload measurements 50 provide feed back 52 which may be provided as an addition input to the configuration engine 24. For example, differences between estimated and actual workload behaviors can be corrected and accommodated by feeding the workload measurements 50 back to the configuration engine 24 which, in turn, can re-evaluate the plural inputs 26–30 and 52 to generate a modified assignment 38. The converter 42 may then generate a modified configuration 44 to correct discrepancies between the estimated and actual workload behaviors, thereby improving the performance of the target system 22. In addition, changes in the workload or device configurations, such as a long-term device failure, can also be corrected through the use of the workload measurements 50. The configuration engine 24 may incrementally modify the assignment 38 to the point at which more equipment is needed for the target system 22 to operated with the desired attributes, at which time the engine 24 may also generate a new equipment order 40.

Figure 2:
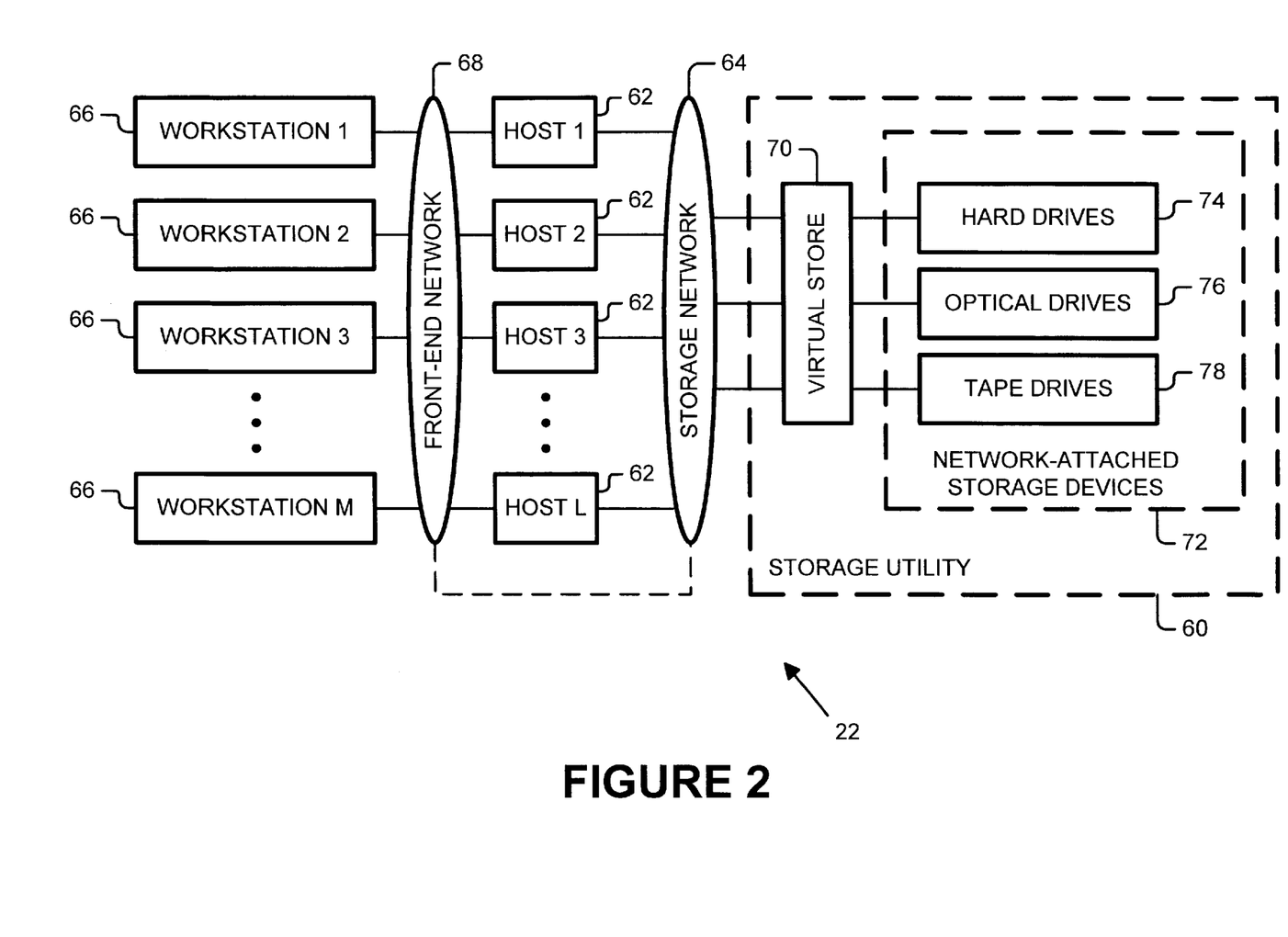
FIG. 2 is a block diagram of an exemplary storage system of the present invention.

With additional reference to FIG. 2, the exemplary target system 22 is illustrated. The system 22 includes a data storage system 60 connected to one or more hosts 62 (i.e., host 1, 2, 3, . . . , l) via a storage network 64, for example, a fiber-channel network. The hosts 62 receive a workload from a plurality of workstations 66 (i.e., workstation 1, 2, 3, . . . , m) via a front-end network 68. Alternatively, the hosts 62 may be bypassed, with the workstations 66 connected directly to the storage network 64, as shown by the dashed line in the figure. As mentioned above, the workstations 66 generate a workload which is then assigned to the storage system 60 in accordance with the assignment 38.

The data storage system 60 may include a virtual store 70 and a plurality of network-attached storage devices (NASD) 72, with the virtual store 70 positioned at the front end of the storage system 60, connected to the storage network 64. The NASD 72 may include any number and types of drives, including hard drives 74, optical drives 76, and tape drives 78. With the storage system 60 configured in such a manner, the details of the actual physical storage system (i.e., the NASD 72) are abstracted from the point of view of the workstations 66 by the virtual store 70.

The virtual store 70 represents a unit of storage to manage the workload from the workstations 66, with an example of the workload being a large-scale data object such as a file system, relational database table, or a single large file. The virtual store 70 maintains a set of quality-of-service attributes desired by the client 34, such as size or capacity, performance capabilities, and resilience (i.e., a set of availability and reliability metrics). In turn, the virtual store 70 is mapped onto the physical storage devices 74–78, with each storage device having a set of capability attributes such as capacity, performance, and availability. The quality-of-service attributes of the virtual store 70 are high-level storage-system goals or requirements, specifying what the storage system 60 is to achieve. The quality-of-service attributes also allow the automated mapping of the workload onto the storage devices 72 while taking into account multiple simultaneous needs like bandwidth, I/O rate, capacity, and system cost.

In view of the foregoing, the storage system 60 is substantially self-configuring and self-managing. The configuration engine 24 determines how the storage system 60 is initially constructed. The workload measurements 50 and the feedback 52 input enable the configuration engine 24 to automatically modify the data storage system 60 in response to changes in needs and workloads and to changes in configuration resulting from device failures and upgrades.

Figure 3:
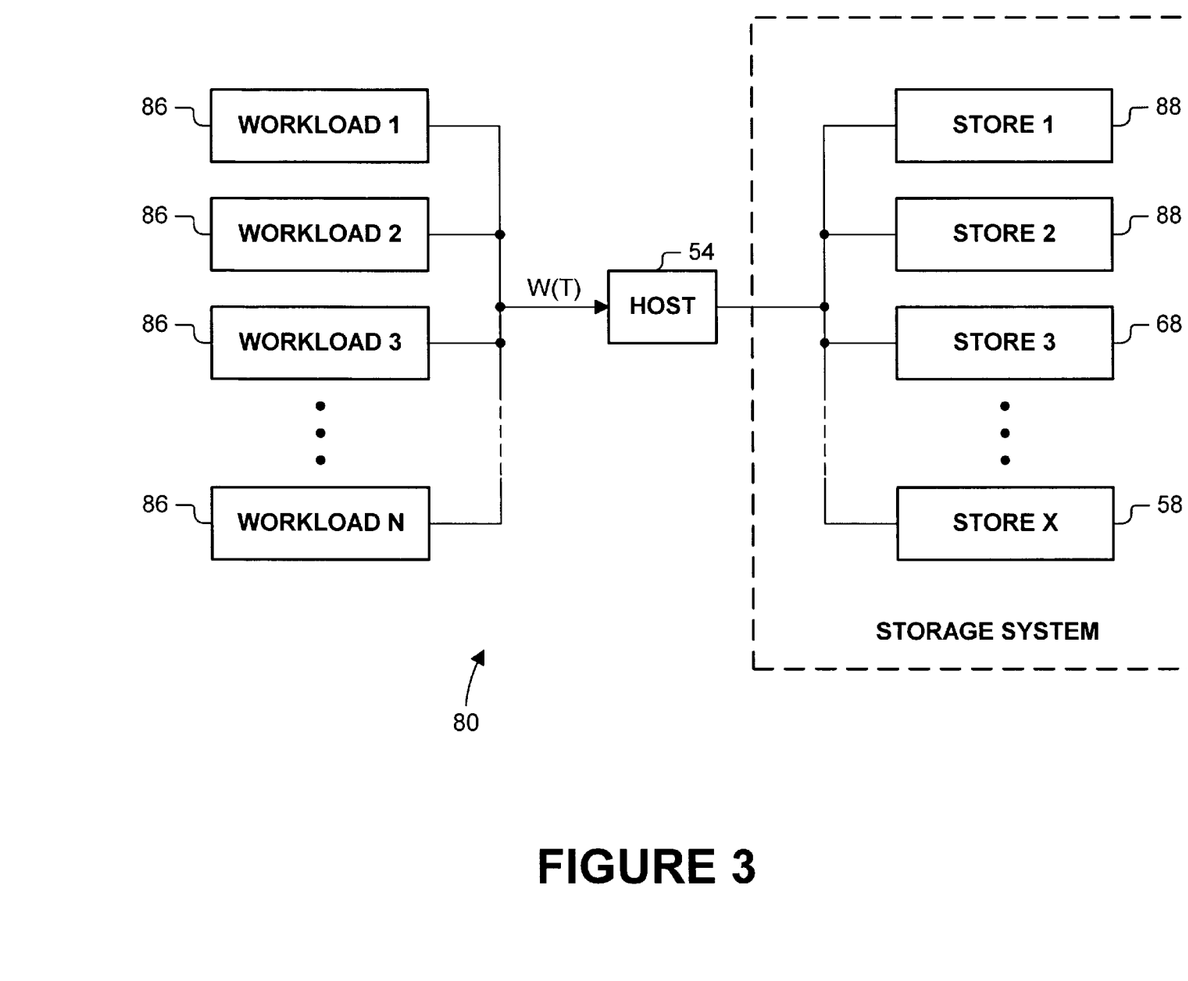
FIG. 3 is a block diagram of a simplified storage system of the invention.
Figure 4:
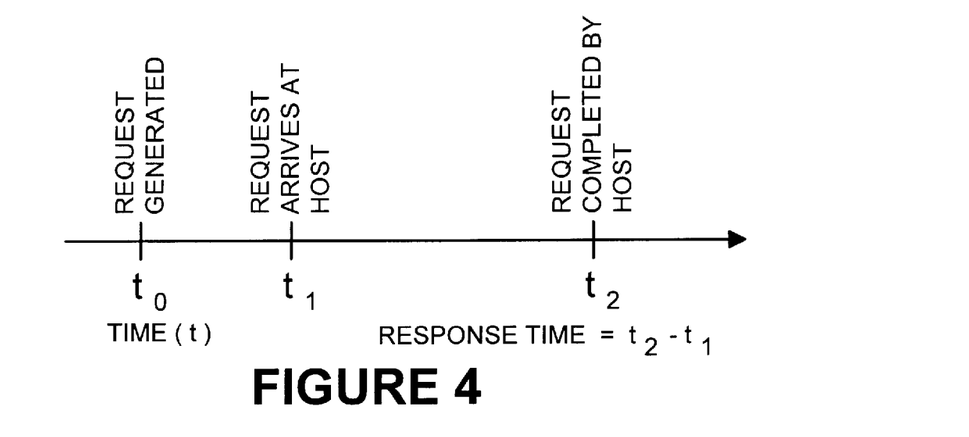
FIG. 4 is a graph illustrating the response time of a device of the invention.

With reference to FIG. 3, an exemplary target system 80 is shown in a more simplified manner than that shown in FIG. 2 to illustrate the principles of the invention in a more clear manner. The target system 80 includes a data storage system 82 connected to a host 84 which, in turn, is connected to a plurality of workloads 86 (i.e., workload 1, 2, 3, ..., n). The storage system 82 includes a plurality of storage devices 88 (i.e., store 1, 2, 3, . . . , x). The workloads 86 generate requests which are serviced by the host 84. The response time is the time it takes the host 84 to service a request, which is illustrated graphically in FIG. 4.

As discussed above, one of the quality-of-service attributes associated with capacity planning for the target system 80 is in the form of "P% of all requests must achieve a response time of less than T seconds." This phrase is equivalent to requiring that the P percentile (i.e., the 0.01 P-quantile, or p-quantile) of response time in the system 80 must not exceed T seconds. For example, if the quality-of-service attribute is phrased, "95% of all requests must achieve a response time of less than 0.25 second," then the equivalent p-quantile attribute is the 0.95-quantile (i.e., the $95^{th}$ percentile) of response time in the system 80 must not exceed 0.25 second.

In configuring the target system 22, the configuration engine 24 operates in accordance with the following proposition:

> If a host starts with no requests pending and if all the requests arriving at the host in any period of time T can be serviced by the host in time T or less, then all the requests pending at the host at any time t can be serviced in time T or less.

In effect, this proposition states that if it can be guaranteed that the requests from the combined workloads 86 arriving at the host 84 in every interval of length T do not require more than T seconds to serve, then the response time for all requests is bounded by T seconds.

In practical applications, it is difficult to guarantee that the response time for the requests arriving in any interval of length T will not exceed T because neither the workload process nor the response times of the requests are known exactly. The present invention, therefore, utilizes a probabilistic description of the system. The preposition provided above is accordingly relaxed into the following rule which holds for most practical implementations:

> If the total response time required by the requests generated by the combined workload at the host in every interval (t, t+T) is less than T seconds with a probability p, then the response time for all requests is T seconds or less with probability p.

Utilizing this rule, the exemplary requirement that 95% of the requests see a response time of less than T seconds becomes the requirement that the work arriving at the host 84 in intervals of length T takes less than T seconds to complete with a probability of p=0.95.

Figure 7:
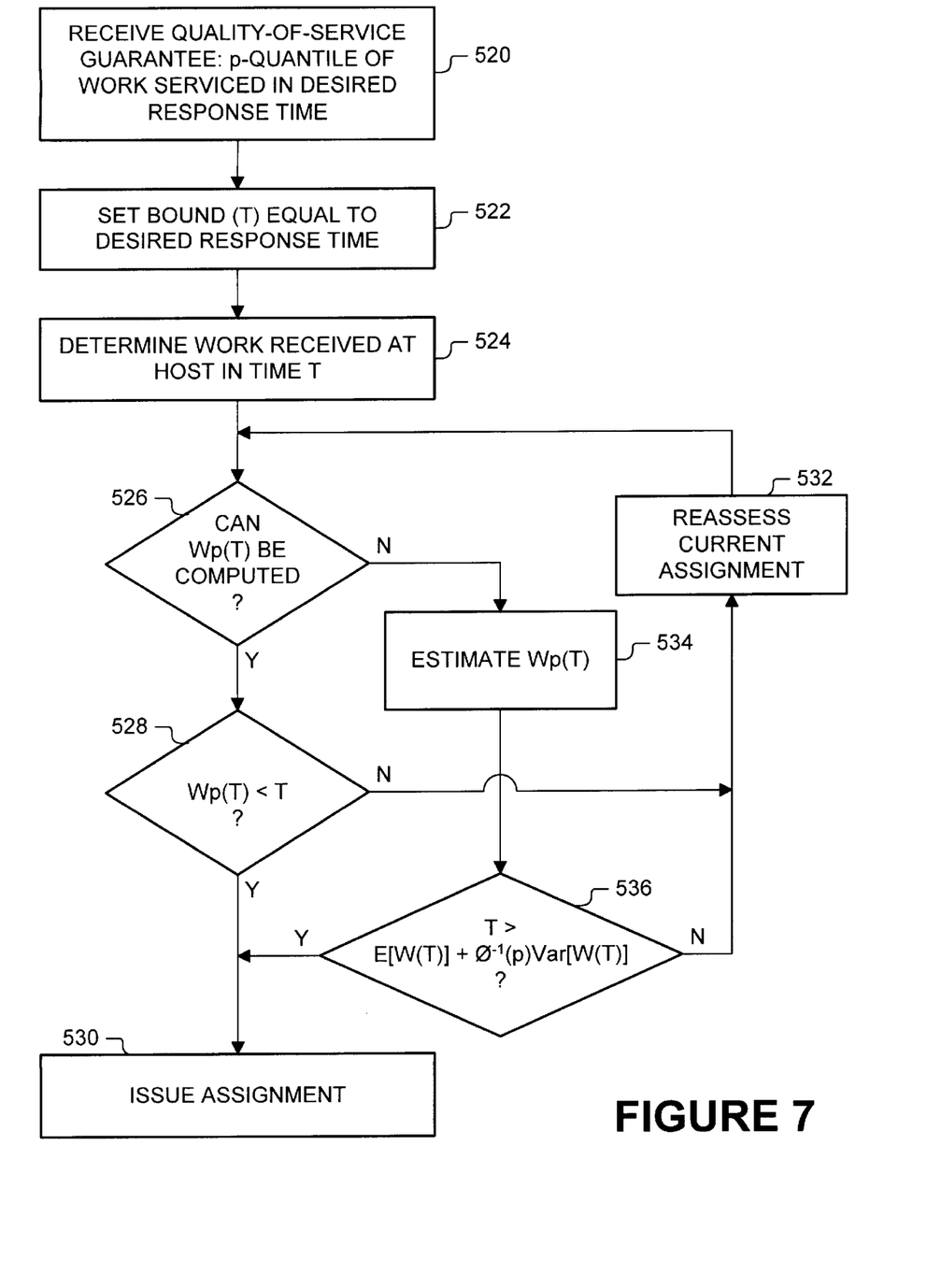
FIG. 7 is a flow diagram illustrating exemplary methodology of the present invention, particularly methodology directed to determining whether a quality-of-service guarantee is satisfied.

With additional reference to FIG. 7, the configuration engine 24 implements the rule provided above as follows. The configuration engine 24 receives the desired quality-of-service attribute (step S20) from, for example, the business-needs input 28, thereby providing the p-quantile value and the desired response time. A bound of time T is set to be equal to the desired response time (step S22). The next step is to determine or to estimate the work received at the host 84 in a time interval (t, t+T) (step S24), where the variable W(T) represents this work generated by the combined workload 86 and time T is the length of time over which the arriving work is limited, which is equal to the bound time T. The workload W(T) may be input from the workload library 32 or may be input by a system designer.

Figure 5:
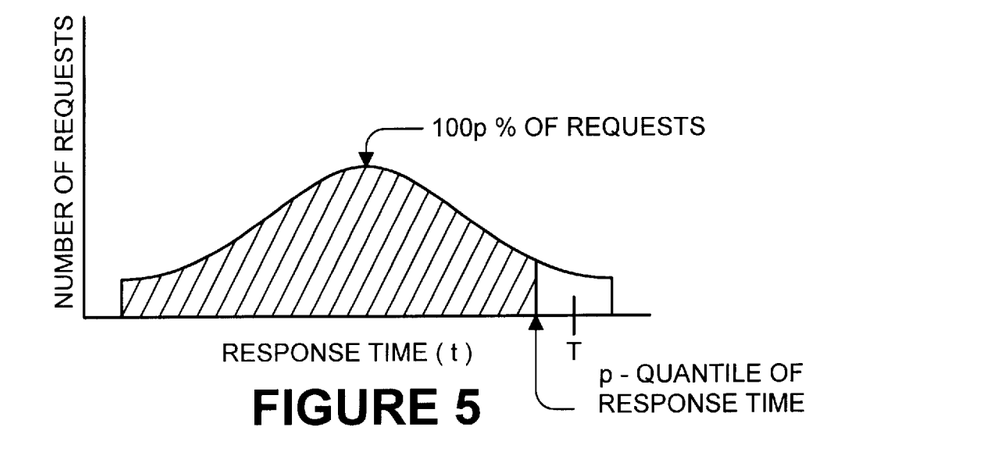
FIG. 5 is a graph illustrating a p-quantile of response time of a workload distribution.
Figure 6:
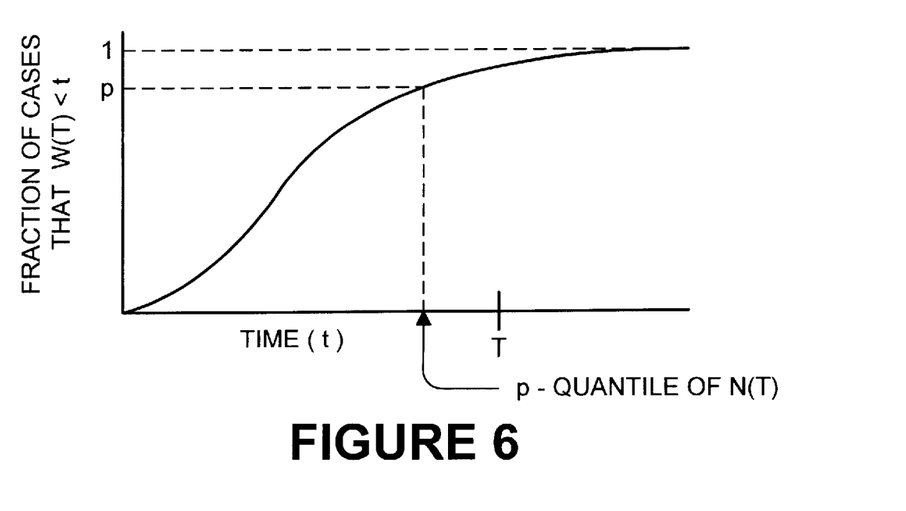
FIG. 6 is a graph illustrating a workload distribution.

The workload W(T) is a random variable with a probability distribution, with the variable $W_p(T)$ representing the p-quantile of this distribution. An exemplary estimated distribution of the workload W(T) is shown in FIG. 5, which distribution may be generated by the configuration engine 24 upon receiving the workload specifications 26. With additional reference to FIG. 5, according to the above rule, the p-quantile of the response time of requests at the host 84 is bound by time T if the following condition is met:

$$W_p(T) < T.$$

The units of the workload distribution W(T) is in terms of time, where it is determined the total length of time for the host 84 to complete the work. If the length of time of the p-quantile of the workload distribution $W_p(T)$ is less than the bound T, then the condition is met.

When the p-quantile of the workload distribution $W_p(T)$ can be computed directly (step S26) by, for example, the configuration engine 24 or the system designer, the above condition can be used directly to verify if the bound on the p-quantile of response time is satisfied (step S28) by the present configuration 44 of the target system 22. If the condition is met, then the configuration engine 24 may issue an assignment 38. If not, the configuration engine 24 reassesses the current assignment (step S32) and generates a revised assignment, and the process repeats.

If the p-quantile of the workload distribution $W_p(T)$ cannot be computed directly, then $W_p(T)$ is estimated (step S34). In most instances, the p-quantile of the workload distribution $W_p(T)$ cannot be computed directly because workload processes, response times, and other factors are not known exactly. The estimation of $W_p(T)$ is determined by calculating the expected mean value and the variance of W(T), from which $W_p(T)$ may be approximated by the configuration engine 24 by using the following normal approximation for the distribution of W(T):

$$W_p(T) \approx E[W(T)] \Phi^{-1}(p) \sqrt{Var[W(T)]}$$

where $\Phi(\cdot)$ is the cumulative distribution function of a unit normal variable and $\Phi^{-1}$ is the inverse of the cumulative distribution function of a unit normal variable $\Phi(\cdot)$, that is, $\Phi^{-1}[\Phi(x)]=x$ for all x. Alternatively, the estimation of the p-quantile of workload distribution $W_p(T)$ may be carried out from the mean value and variance using standard distributions other than the normal distribution described herein.

As set forth in the preceding equation, the p-quantile of the workload distribution $W_p(T)$ is estimated as the p-quantile of a normal distribution with a given mean value E[W(T)] and a given variance Var[W(T)]. The p-quantile of a normal distribution may be computed by first calculating the inverse cumulative distribution function of a unit normal distribution $\Phi^{-1}$ (i.e., a normal distribution with a mean value of zero and a variance of one) at value p, and then multiplying this inverse function by the square root of the variance Var[W(T)]. Alternatively, the p-quantile of a normal distribution may be computed by calculating the inverse cumulative distribution function of a normal distribution with a zero mean and a given variance, and then adding this inverse cumulative distribution to the given mean. The value of the inverse cumulative distribution function of a unit normal distribution may also be looked up in a table and entered into the configuration engine 24.

To calculate the mean value and variance of W(T) for the exemplary embodiment shown in FIG. 3 with the host 84 assigned n independent workloads 86 (i.e., workload 1, workload 2, workload 3, ... workload n), it can be assumed that the requests arriving at the host 84 are approximated by Poisson processes with request rates of $\lambda_1, \lambda_2, \epsilon_3, \ldots, \lambda_n$, respectively, which may be input to the configuration engine 24 by the workload specifications 26. It can also be assumed that the mean and variance of the response time of a request from a workload i at the host 84 are $E[S_i]$ and $Var[S_i]$, respectively, the values of which may also be input via the workload specifications 26. Then, for this example:

$$E[W(T)] = \Sigma(i=1 \text{ to } n)\{\lambda_i(T)E[S_i]\}$$

and $$Var[W(T)] = \Sigma(i=1 \text{ to } n)\{\lambda_i T(E[S_i]^2 + Var[S_i])\}.$$

Upon calculating the mean E[W(T)] and variance Var[W(T)] of the work W(T), the following test may be used to determine whether the p-quantile of the response time is lower than the desired bound T (step S36):

$$E[W(T)] + \Phi^{-1}(p) Var[W(T)] < T.$$

If the condition is met, then the configuration engine 24 has verified that the p-quantile of the response time is lower than the desired bound T and may issue the assignment 38 (step S30). If not, the configuration engine 24 reassesses the current assignment (step S32) and repeats the process described above.

As discussed above, queue delays in the data storage system 82 may occur when the host 84 receives one or more additional requests while in the process of servicing an already-received request. In accordance with the present invention, queue delays are substantially reduced by requiring that the work W(T) arriving at the host 84 in a predetermined period of time T must not exceed that which the device can perform in that period of time. Time T is tunable or adjustable based upon the desired quality-of-service guarantee for the system. The smaller the value of time T, the more stringent the quality of service becomes. For feasability, time T needs to be larger than the time it takes the host 84 to service a request.

Figure 8:
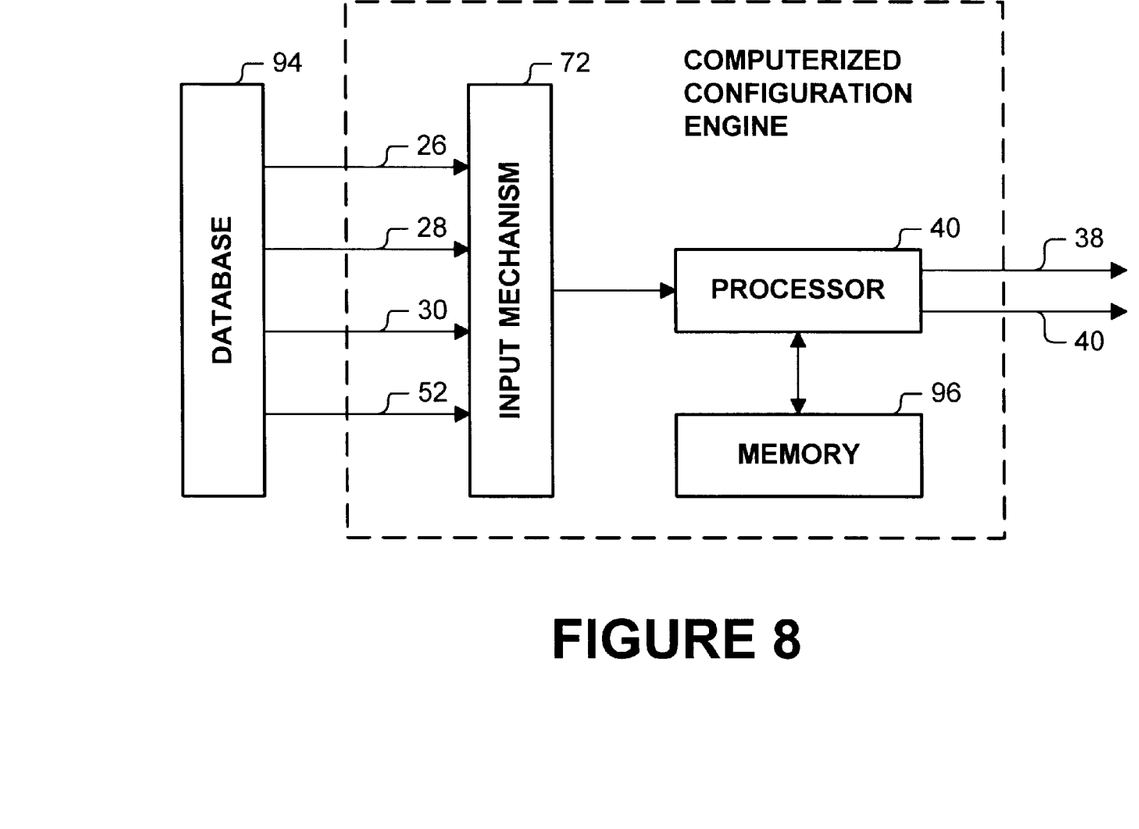
FIG. 8 is a block diagram of a computerized configuration engine of the present invention.

With reference to FIGS. 1 and 8, the configuration engine 24 may be a computerized system (e.g., a mainframe computer) programmed to operate in accordance with the methodology described above. Accordingly, the configuration engine 24 may include a processor 90 and an input mechanism 92 for receiving the inputs 26–30 and 52. The input mechanism 92 may be connected to a database 94 for storing data related to the workload specifications 26, the business needs 28, the storage-device specifications 30, and the control and feedback information 52, which inputs were discussed above. The configuration engine 24 may also include memory 96 connected to the processor 90. The processor 90 operates according to a software module which includes computer-readable instructions stored on a computer-readable medium and made available to the processor 90, for example, by being stored in the memory 96. The processor 90 reads the code (i.e., computer-readable instructions) of the software module and operates in accordance with the configuration engine described above. The input mechanism 92 may include communication ports, keyboards, disk drives, and so on.

In addition to generating an assignment 38 for a particular configuration, the configuration engine 24 operating in accordance with the methods of the invention may also be utilized in predicting performance and response times of proposed configurations of data storage systems. For example, the configuration engine 24 may determine the effect of adding new storage devices to an existing system, particularly the effect on performance and response time.

Those skilled in the art will understand that the present invention is not limited to the specifically illustrated and described embodiments above. The scope of the present invention is determined by the terms of the appended claims and their legal equivalents, rather than by the examples described above.

What is claimed is:

1. A method of using a computer to configure a data storage system that satisfies a quality-of-service guarantee, said method comprising:
   processing a workload specification by the computer, said workload specification including information indicative of a workload to be serviced by a device;
   processing a quality-of-service guarantee indicating a predetermined percentage of said workload to be serviced by the device within a predetermined response time;
   setting a p-quantile value equal of the predetermined percentage;
   setting a bound equal to the predetermined response time;
   estimating a distribution of said workload arriving at the device during an interval of time equal to said bound; and
   using the computer to determine whether a p-quantile of said workload distribution is less than said bound.

2. A method as claimed in claim 1 wherein said determining step comprises:
   using the computer to compute said p-quantile of said workload distribution; and
   comparing said p-quantile of said workload distribution to said bound.

3. A method as claimed in claim 1 wherein said workload distribution has a normal distribution with a given mean and a given variance, said determining step comprising:
   using the computer to estimate said p-quantile of said workload distribution; and
   comparing said p-quantile of said workload distribution to said bound.

4. A method as claimed in claim 3 wherein said step of using a computer to estimate said p-quantile of said workload distribution comprises:
   computing an inverse cumulative distribution function of said workload distribution.

5. A method as claimed in claim 4 wherein said workload distribution has a normal distribution with a zero mean and a given variance, said step of computing said inverse cumulative distribution function comprising:
   computing an inverse cumulative distribution function of said workload distribution with said zero mean and said given variance; and
   computing the sum of:
      said inverse cumulative distribution function of said workload distribution with said zero mean and said given variance; and
      said given mean of said workload distribution.

6. A method as claimed in claim 3 wherein said workload distribution has a normal distribution with a zero means and a given variance, said step of using a computer to estimate said p-quantile of said workload distribution comprising:
   computing an inverse cumulative distribution function of said workload distribution with said zero mean and said given variance.

7. A method as claimed in claim 6 wherein said workload distribution has a normal distribution with a zero mean and a variance of one, said step of computing said inverse cumulative distribution function comprising:
   computing an inverse cumulative distribution function of said workload distribution with said zero mean and said variance of one; and
   computing the product of:
      said inverse cumulative distribution function of said workload distribution with said zero mean and said variance of one; and
      a square root of said variance.

8. A method as claimed in claim 1 further comprising:
   generating an assignment containing information describing the way in which said workload distribution is to be mapped across the data storage system if said p-quantile of said workload distribution is less than said bound.

9. A computerized configuration engine for configuring a data storage system including a host and a plurality of storage devices to satisfy a quality-of-service guarantee, said computerized configuration engine comprising:
   a processor for processing workload specifications and a quality-of-service guarantee, the workload specifications including information indicative of a workload to be serviced by the host, the quality-of-service guarantee indicating a predetermined percentage of said workload to be serviced by the host within a predetermined response time, said processor:
      setting a p-quantile value equal of said predetermined percentage of said quality-of-service guarantee;
      setting a bound equal to said predetermined response time of said quality-of-service guarantee;
      estimating a workload distribution arriving at the host during an interval of time equal to said bound, from said workload specification; and
      determining whether a p-quantile of said workload distribution is less than said bound.

10. A computerized configuration engine as claimed in claim 9 wherein said processor determines whether said p-quantile of said workload distribution is less than said bound by:

computing said p-quantile of said workload distribution; and comparing said p-quantile of said workload distribution to said bound.

11. A computerized configuration engine as claimed in claim 9 wherein said processor determines whether said p-quantile of said workload distribution is less than said bound by:

estimating said p-quantile of said workload distribution; and comparing said p-quantile of said workload distribution to said bound.

12. A computerized configuration engine as claimed in claim 11 wherein said workload distribution has a normal distribution with a given mean and a given variance, said processor estimating said p-quantile of said workload distribution by:

computing an inverse cumulative distribution function of said workload distribution.

13. A computerized configuration engine as claimed in claim 12 wherein said workload distribution has a normal distribution with a zero mean and a given variance, said processor computing said inverse cumulative distribution function by:

computing an inverse cumulative distribution function of said workload distribution with said zero mean and said given variance; and computing the sum of:
said inverse cumulative distribution function of said workload distribution with said zero mean and said given variance; and
said given mean of said workload distribution.

14. A computerized configuration engine as claimed in claim 9 wherein said processor generates an assignment containing information describing the way in which said workload is to be mapped across the data storage system if said p-quantile of said workload distribution is less than said bound.

15. A computerized configuration engine as claimed in claim 9 further comprising:

a database connected to said input mechanism for storing data of workload specifications and storage-device specifications.

16. A computer-readable storage medium storing a set of computer-readable instructions for causing a computer containing an input mechanism and a processor to configure a data storage system including a host device and a plurality of storage devices to satisfy a quality-of-service guarantee in accordance with the following steps:

receiving a workload specification via the input mechanism, said workload specification including information indicative of a workload to be serviced by the host;

receiving the quality-of-service guarantee via the input mechanism, the quality-of-service guarantee having a predetermined percentage of a workload to be serviced by the host device within a predetermined response time;

setting a p-quantile value equal of the predetermined percentage of the workload;

setting a bound equal to the predetermined response time;

estimating a distribution of said workload arriving at the host during an interval of time equal to said bound; and determining whether a p-quantile of said workload distribution is less than said bound.

17. A computer-readable storage medium as claimed in claim 16 wherein said set of computer-readable instructions further causes the computer to:

generate an assignment containing information describing the way in which said workload distribution is to be placed across the data storage system if said p-quantile of said workload distribution is less than said bound.

18. A computer-readable storage medium as claimed in claim 16 wherein said set of computer-readable instructions further causes the computer to:

calculate said p-quantile of said workload distribution; and compare said p-quantile of said workload distribution to said bound.

19. A computer-readable storage medium as claimed in claim 16 wherein said set of computer-readable instructions further causes the computer to:

estimate said p-quantile of said workload distribution; and compare said p-quantile of said workload distribution to said bound.

20. A computer-readable storage medium as claimed in claim 19 wherein said workload distribution has a normal distribution with a given mean and a given variance, said set of computer-readable instructions further causes the computer to carry out the following step in estimating said p-quantile of said workload distribution:

computing an inverse cumulative distribution function of said workload distribution.

* * * * *